United States Patent [19]

Salisbury

[11] 4,363,137

[45] Dec. 7, 1982

[54] WIRELESS TELEMETRY WITH MAGNETIC INDUCTION FIELD

[75] Inventor: Winfield W. Salisbury, Scottsdale, Ariz.

[73] Assignee: Occidental Research Corporation, Irvine, Calif.

[21] Appl. No.: 59,656

[22] Filed: Jul. 23, 1979

[51] Int. Cl.³ .................... H04B 12/02; H01V 1/40
[52] U.S. Cl. .................... 455/40; 340/870.17; 250/265
[58] Field of Search .................. 325/15, 16, 28, 31, 325/59, 64, 66, 67, 113, 152, 178; 250/256, 253, 262-266, 301, 259; 455/40, 41, 42, 43, 67, 89, 90, 95, 98, 128, 129; 340/182, 195, 196, 870.17, 870.37; 116/250, 251, 256, 64, 65 R, 65 M, 66; 175/40.50

[56] References Cited

U.S. PATENT DOCUMENTS

| | | | |
|---|---|---|---|
| 2,647,991 | 8/1953 | Tatel | 325/113 |
| 2,840,694 | 6/1958 | Morgan | 455/95 |
| 2,931,897 | 4/1960 | Tuve | 325/113 |
| 3,008,666 | 11/1961 | Kuck | 325/113 |
| 3,541,450 | 11/1970 | Paine | 325/113 |
| 3,651,405 | 3/1972 | Whitney | 325/113 |
| 3,900,878 | 8/1975 | Tsao | 325/28 |
| 3,967,201 | 6/1976 | Rorden | 325/28 |
| 4,087,781 | 5/1978 | Grossi et al. | 455/90 |
| 4,199,026 | 4/1980 | McCollum | 165/251 |

*Primary Examiner*—Tommy P. Chin
*Attorney, Agent, or Firm*—Christie, Parker & Hale

[57] ABSTRACT

A data communication system has a transmitting antenna (18,19), a source (34) of data to be transmitted, a carrier source (45), and a modulator (41,42,43) located at a first point. The transmitting antenna includes an inductive winding (17) having an electrical length significantly smaller than the wavelength of the carrier. The carrier modulated with the data is applied to the transmitting antenna to generate a magnetic induction field about the first point. A receiving antenna (53,54) is located at a second point remote from the first point. The receiving antenna includes an inductive winding (53) having an electrical length significantly smaller than the wavelength of the carrier. The windings of the transmitting and receiving antennas enclose mutually exclusive regions and are uncoupled magnetically except for the medium between the first and second points. A portion of the field generated by the transmitting antenna is intercepted by the receiving antenna to produce a signal that is demodulated (51) and stored (52).

15 Claims, 5 Drawing Figures

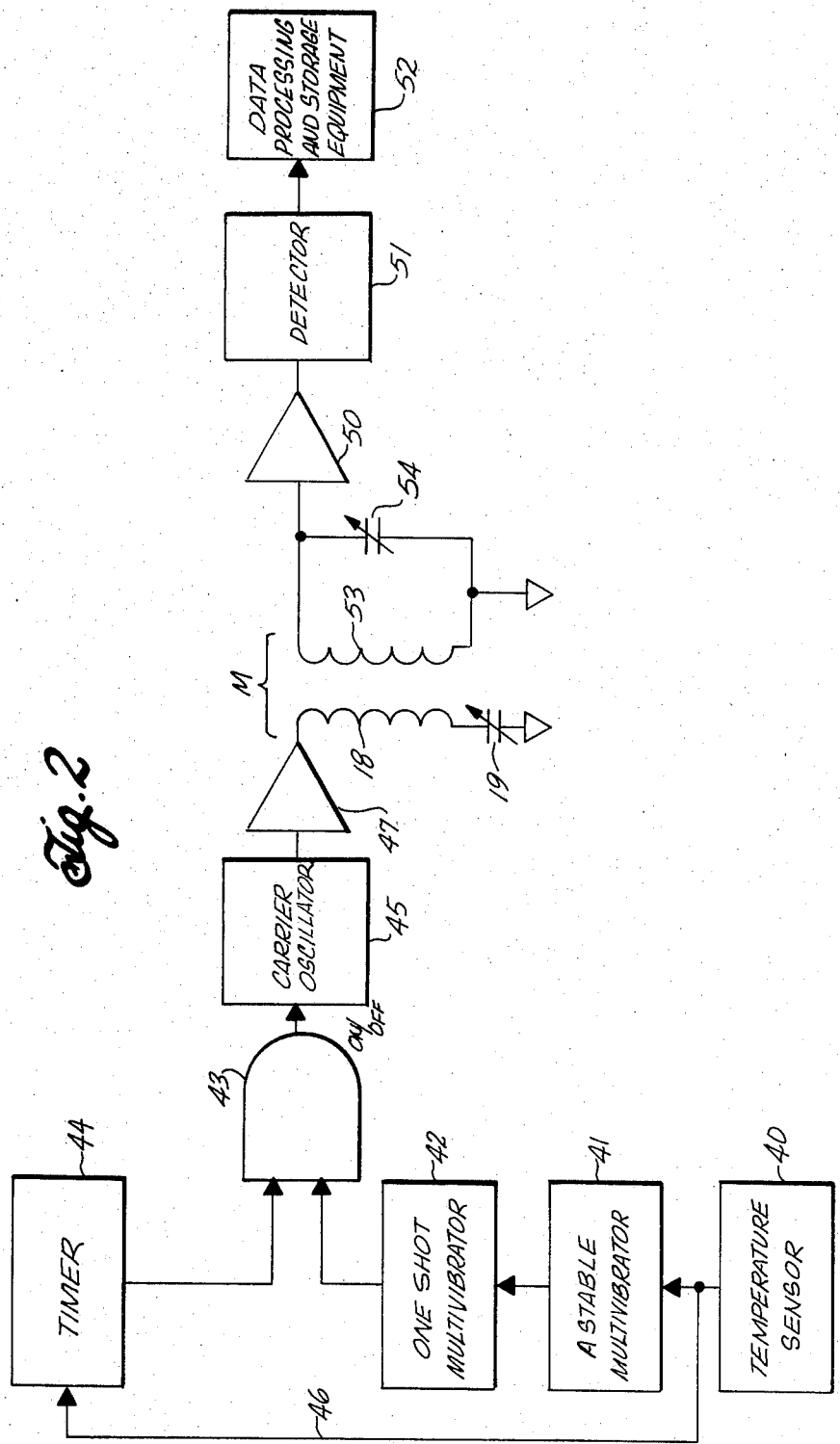

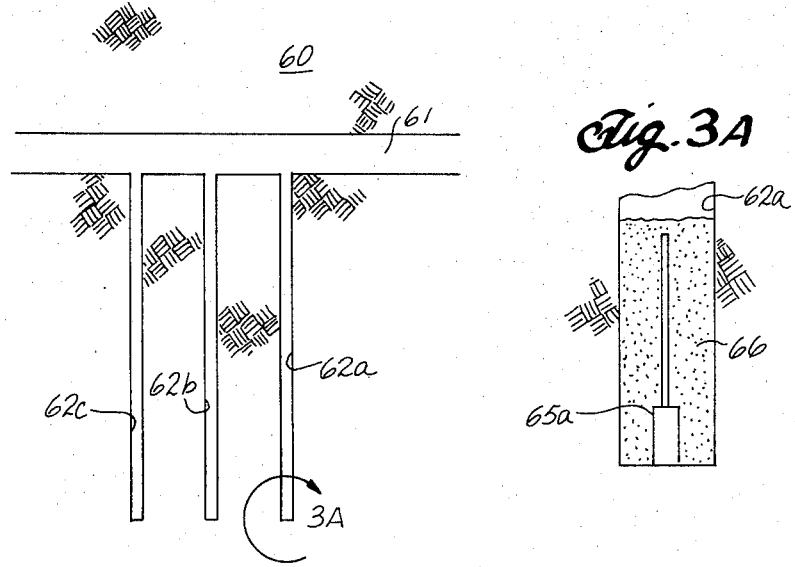
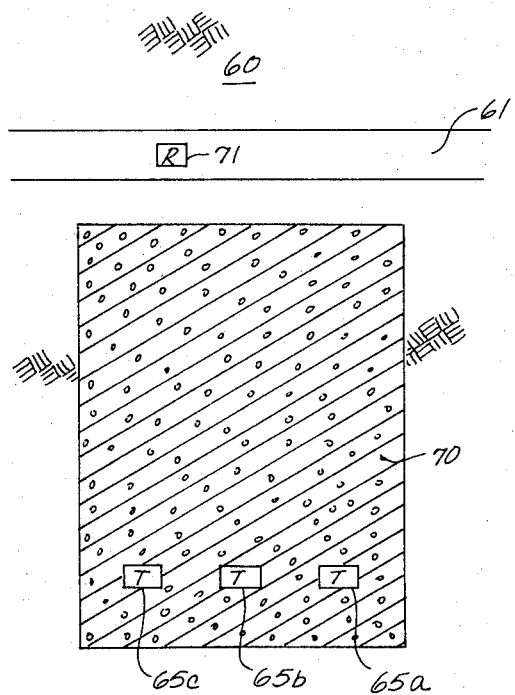

WIRELESS TELEMETRY WITH MAGNETIC INDUCTION FIELD

BACKGROUND OF THE INVENTION

This invention relates to telemetry and, more particularly, to wireless transmission of data through a medium where radiowaves cannot be used.

Radiowaves are so sharply attenuated in rock formations due to their water content that the range of radio transmission through subterranean rock formations is very small, namely, in the order of several feet, or at most several yards. Wire transmission is also difficult in applications requiring data communication from a subterranean point, such as emergency communication in an underground mine or temperature telemetry in an in situ oil shale retort.

SUMMARY OF THE INVENTION

One aspect of the invention is a method for transmitting data from an inaccessible subterranean point to a subterranean or above ground receiving point. A carrier is modulated with the data. The modulated carrier is converted to an alternating magnetic induction field emanating from the inaccessible point. The magnetic induction field is intercepted at the receiving point, and the data is recovered from the intercepted field. When the described method is used to monitor temperature of a processing zone in an in situ oil shale retort, a transmitter is implanted in the retort before its fragmentation. After fragmentation of the retort and initiating of retorting therein, the modulated magnetic induction field is intercepted outside the retort to determine the temperature as the processing zone progresses toward the transmitter. Preferably, a temperature sensor is spaced in advance of the transmitter in the path of the processing zone to measure the temperature of the approaching processing zone before it reaches the transmitter.

Another aspect of the invention is a data communication system in which a transmitting antenna, a source of data to be transmitted, a carrier transmitter, and a modulator are located at a first point. The transmitting antenna includes an inductive winding having an electrical length significantly smaller than the wavelength of the carrier. The carrier modulated with the data is applied to the transmitting antenna to generate a magnetic induction field about the first point. A receiving antenna is located at a second point remote from the first point. The receiving antenna includes an inductive winding having an electrical length significantly smaller than the wavelength of the carrier. The windings of the transmitting and receiving antennas enclose mutually exclusive regions, and are uncoupled magnetically except for the medium between the first and second points. A portion of the field generated by the transmitting antenna is intercepted by the receiving antenna to produce a signal that is demodulated to yield the transmitted data. Preferably, the transmitted data is processed and stored at the second point or transmitted to a central data processing and storage point. Preferably, the frequency of the carrier is less than 100 khz.

BRIEF DESCRIPTION OF THE DRAWINGS

The features of a specific embodiment of the best mode contemplated of carrying out the invention are illustrated in the drawings, in which:

FIG. 2 is a schematic block diagram of the transmitter of FIG. 1 and a receiver for practicing the invention;

FIG. 3 is a schematic diagram of implantation of the transmitter of FIG. 1 in a subterranean oil shale deposit, prior to fragmentation;

FIG. 3A is an enlargement of a portion of FIG. 3; and

FIG. 4 is a schematic diagram of the deposit of FIG. 4, after fragmentation to form the retort, depicting a complete data communication system for practicing the invention.

DETAILED DESCRIPTION OF THE SPECIFIC EMBODIMENT

Figure 1:
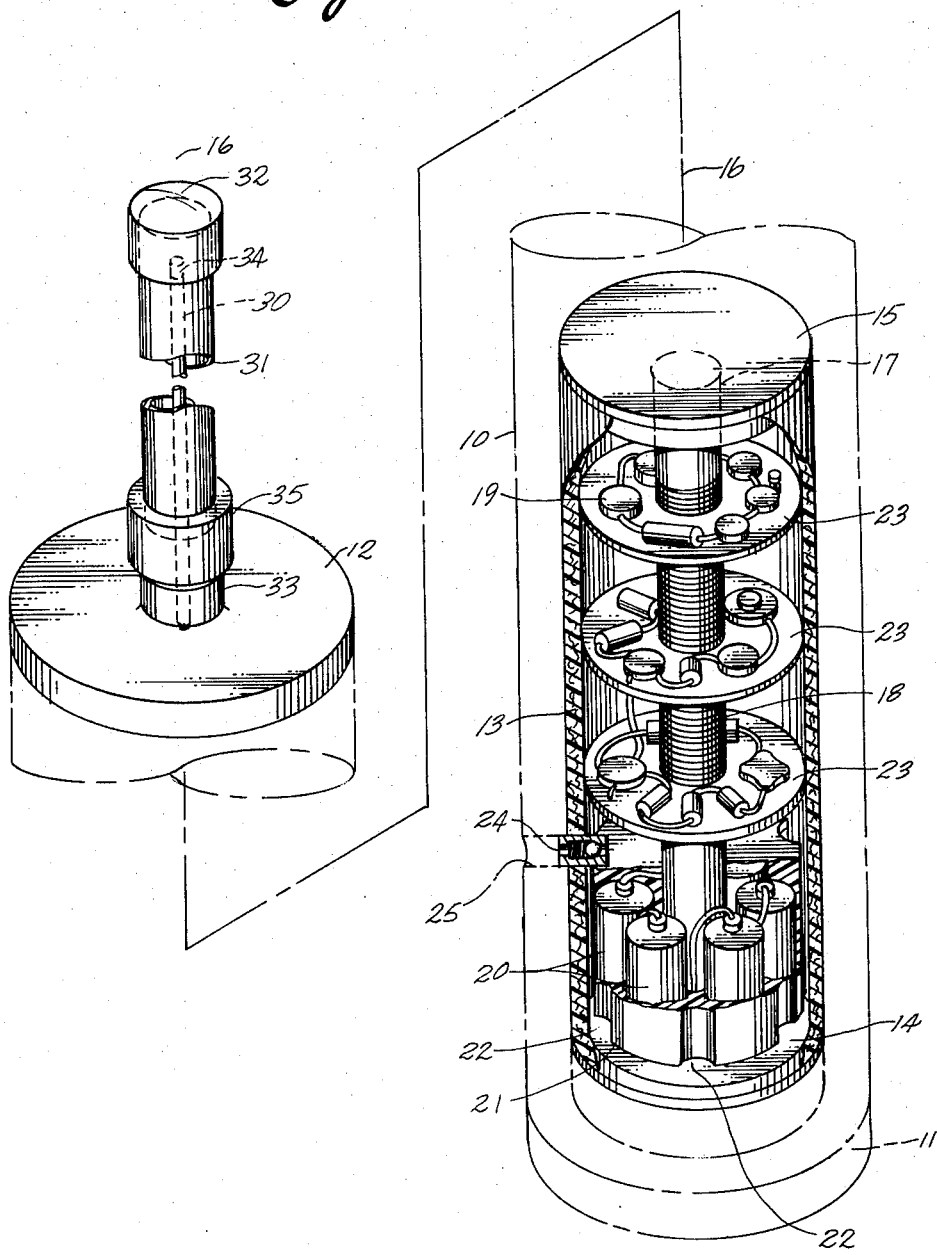
FIG. 1 is a perspective partially cut-away view of the package of a transmitter for practicing the invention.

In FIG. 1, a transmitter package has an outer housing comprising a hollow cylinder 10 and caps 11 and 12 fitting on the ends of cylinder 10. In one embodiment, cylinder 10 and caps 11 and 12 are made of a shock absorbing foam laminated with aluminum foil to provide shock and temperature protection. An inner housing comprises a hollow cylinder 13 fitting snugly inside cylinder 10 and caps 14 and 15 fitting in the ends of cylinder 13. In one embodiment, cylinder 13 and caps 14 and 15 are made of fiberglass, to provide further heat insulation. The inner and outer housings are centered on an imaginery axis 16 with which an antenna is aligned from end to end in the inner housing. The antenna comprises a hollow core 17 made of a material with high permeability, an inductive winding 18 formed from insulated wire wrapped around core 17, and a tuning capacitor 19. In one embodiment, core 17 is made of a suitable ferrite material. A plurality of dry cell batteries 20 lie in an annular arrangement within bores inside a cylindrical battery container 21 that fits snugly within cylinder 13 at one end. One end of core 17 together with winding 18 extends through a bore in the center of container 21 to the end of the inner housing. A plurality of longitudinal grooves 22 are formed in the outer surface of container 21 between adjacent pairs of batteries 20. Batteries 20 provide the power for the electronic components of the transmitter described below in connection with FIG. 2. In one embodiment, container 21 is solid fiberglass milled out to form grooves 22 and the bores in which batteries 20 and the end of core 17 are disposed. Core 17 is held in place by container 21 and a protrusion at the center of cap 15, which extends into the interior of the other end of core 17. Annular circuit boards 23 are secured to core 17 at spaced apart locations along its length. The electronic components of the transmitter described below in connection with FIG. 2 are mounted on circuit boards 23. The housing is charged with an evaporative liquid which circulates into grooves 22 to dissipate the battery heat. A one way valve 24 is mounted in cylinder 13 near container 21 in alignment with a hole 25 through cylinder 10 to allow the evaporative liquid to escape as it vaporizes. In one embodiment, the evaporative liquid is freon. Alternatively, if it is not found necessary to dissipate the heat inside the transmitter by this method, the interior of the inner housing could be potted.

A probe at the top of the transmitter package comprises a wand 30 extending from the interior of the inner housing through caps 15 and 12 upwardly in alignment with axis 16 and a cylindrical flexible outer cover 31 that surrounds wand 30. A temperature sensor 34 is located at the free end of wand 30, and electrical conductors (not shown) extend through wand 30 from the temperature sensor to the electronic components mounted on circuit boards 23. One end of housing 31 is covered by a cap 32, and the other end of cover 31 is connected to a nipple 33 on cap 12 by a coupling 35. The interior of cover 31 is filled with a viscous liquid to protect wand 30, the temperature sensor 34, and the conductors from explosive shock.

In FIG. 2, the transmitter described in FIG. 1 communicates with a receiver via the magnetic induction field produced at the transmitter. Temperature sensor 34 is coupled to an astable multivibrator 41 to control its frequency of operation. As the temperature at the end of the probe shown in FIG. 1 rises, the resistance of sensor 34 increases, and the frequency of the output signal from multivibrator 41 increases accordingly. The output of multivibrator 41 is connected to the trigger input of a one-shot multivibrator 42 such that multivibrator 42 is switched to its astable state each time the output signal from multivibrator 41 undergoes a transition in one direction, e.g., from negative to positive. The duration of the astable state of multivibrator 42 is less than the minimum period of the output signal from multivibrator 41 over its range of frequency adjustment. Thus, multivibrator 42 produces as an output signal, pulses of constant duration and variable frequency increasing with temperature. The output of multivibrator 42 is coupled to one input of an AND gate 43. A timer 44 that produces pulses many times larger in duration than multivibrator 42 is coupled to the other input of AND gate 43. Timer 44 could also be an astable multivibrator that drives a one-shot multivibrator, although the frequency is much lower than multivibrator 41 and the pulse duration is much larger than multivibrator 42. Normally, timer 44 has a duty cycle smaller than 50% so that it produces pulses only during a fraction of the time. The output of AND gate 43 is connected to an ON/OFF control input of a carrier oscillator 45. The ON/OFF control input of oscillator 45 controls the application of power from batteries 20 (FIG. 1) through a switch, not shown, to the carrier generating circuitry of oscillator 45. During the pulses produced by timer 44, AND gate 43 is activated and the pulses produced by multivibrator 42 are transmitted to the ON/OFF control input of oscillator 45 to turn oscillator 45 on for repetitive periods of time corresponding to the duration of the pulses produced by multivibrator 42. Thus, the carrier generated by oscillator 45 is modulated with the pulses produced by multivibrator 42, which represent the temperature measured by temperature sensor 34. Between pulses produced by timer 44, oscillator 45 remains off, irrespective of the pulses produced by multivibrator 42.

In one embodiment for the purpose of reducing power consumption, temperature sensor 40 is coupled by a lead 46 to a frequency control input of timer 44 to increase the frequency of the on periods of oscillator 45 as the measured temperature rises. This control over the frequency of timer 44 could be analog in nature, or digital in nature, varying the frequency at one or more threshold temperatures.

The output of oscillator 34 is preferably coupled by an amplifier 47 to the antenna, which comprises inductive winding 18 and tunable capacitor 19 in series. The carrier produced by oscillator 45 has a very low frequency, for example, less than 100 khz. The electromagnetic wavelength of such a carrier frequency is larger than 3,000 meters, and the electrical length of winding 18, which would typically be of the order of less than 100 feet, is thus significantly smaller than the carrier wavelength. Accordingly, the electromagnetic radiation from the transmitter antenna is exceedingly small, although a large local alternating modulated magnetic induction field is generated around winding 18.

Located at a point remote from the described transmitter is a receiver comprising an antenna, an amplifier 50, a detector 51, and data processing and storage equipment 52. The receiver antenna comprises an inductive winding 53 and a tunable capacitor 54 connected in parallel across the input of amplifier 50. A portion of the alternating magnetic induction field generated at the transmitter, which is in the form of bursts related in frequency to the measured temperature, is intercepted by winding 53. This field induces across winding 53 a voltage that is coupled by amplifier 50 to detector 51, where it is demodulated to produce pulses equal in frequency and duration to the pulses applied to the ON/OFF control input of oscillator 45. The output of detector 51 is coupled to conventional data processing and storage equipment 52, which stores the data represented by these pulses after linearization and digitization thereof, if desired.

In one embodiment, multivibrator 41 produces pulses having a nominal period of 0.489 of a second. Multivibrator 42 produces pulses having a width of 0.246 of a second, and timer 44 produces a pulse of 60 seconds duration every four hours. As the measured temperature rises, the period of the pulses produced by multivibrators 41 and 42 decreases accordingly. When a temperature above 400° C. is measured, timer 44 begins to produce a pulse of 60 second duration every two hours.

In summary, data is communicated from the transmitter to the receiver by modulating the data on the alternating magnetic induction field. The mutual inductance between windings 18 and 53, which is represented by the bracket labeled M, accounts for the energy transfer from the transmitter to the receiver. Through subterranean rock formations such energy transfer is substantially larger than the electromagnetic energy that can be transferred at radio frequencies. The energy transfer from winding 18 to winding 53 is essentially the transfer from the primary to the secondary of a very loosely coupled transformer. Whereas conventional transformers are usually designed to maximize the coupling coefficient, the coupling coefficient of the "transformer" for practicing the invention is very small, e.g., typically of the order of 0.01% to 0.1%, and for the most part determined by the distance and characteristics of the medium between the transmitter and receiver. Conventional transformers have a primary and secondary wound on a common core and/or enclosing the same regions. In contrast, the "transformer" for practicing the invention has a primary and a secondary enclosing mutually exclusive regions, i.e., the primary does not enclose the secondary, and the secondary does not enclose the primary, because they are spaced apart from each other, and the primary and the secondary are uncoupled magnetically except for the medium between the transmitter and the receiver, i.e., they are not coupled by a core with high permeability.

In FIG. 3 is shown a subterranean oil shale deposit 60 in which an adit 61 is formed. Holes 62a, 62b, and 62c are bored downwardly from adit 61 into a region of the oil shale deposit which is to be fragmented to form a retort. Transmitter packages of the type shown in FIG. 1 electrically configured in the manner shown in FIG. 2, are lowered into one or more holes 62a, 62b, and 62c with the probe extending upwardly from the outer housing, as shown in FIG. 3A for transmitter 65a. The implanted transmitter packages may be protected such as by packing them in sand at the bottom of the bore holes, as represented at 66 in FIG. 3A, to cushion the transmitter package from the shock of the shale fragmenting explosion which is to follow. After the transmitter packages are implanted, the region in which the retort is to be formed is explosively fragmented in a known manner such as that described in U.S. Pat. No. 4,043,595, which issued Aug. 23, 1977 to Gordon French. The disclosure of this patent is incorporated herein by reference.

In FIG. 4, oil shale deposit 60 is shown after fragmentation of the retort, designated 70. Transmitter packages 65a, 65b, and 65c are implanted in the fragmented shale of retort 70, at now inaccessible points because bore holes 62a, 62b, and 62c have been destroyed by the fragmentation process. Transmitter packaged 65a, 65b, and 65c communicate with the receiver of FIG. 2, designated 71, at a remote point, namely, in adit 61. Specifically, a portion of the magnetic induction field generated in the shale around each transmitter is intercepted by receiver 71. Transmitter packages 65a, 65b, and 65c have different carrier frequencies so receiver 71 can distinguish them from each other. Receiver 71 can be connected by wires to data processing equipment (DPE), designated 72, above ground. The fragmented shale is ignited at the top of the retort and burns slowly in a downward direction. As the combustion zone approaches the transmitter packages, it heats up the probe before it heats up the inner and outer housings of the transmitter package. Thus, the high temperature is measured by the probe and transmitted to receiver 71 before the housings of the transmitter packages heat up enough to destroy the electronic transmitter components.

This invention has successfully transmitted through oil shale temperature data modulated on a number of different carrier frequencies within the range of 1 to 40 khz over a range of 100 feet to 1,000 feet depending upon the equipment characteristics such as transmitter power and local magnetic interference and noise. Higher frequencies, at least as high as 100 khz, could also be used. In general, the higher the frequency of the carrier, the lower the transmitting range in rock formations.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, although the invention is most advantageously used to transmit data through a medium that will not effectively transmit radiowaves, such as subterranean rock deposits, it could also be used to transmit data through other media at low frequency, such as free space.

What is claimed is:

1. A method for determining the temperature of a remote point in an in situ oil shale retort, the method comprising the steps of:

igniting the shale in the retort to initiate retorting along a retorting path;

implanting in the retort at the remote point a temperature sensor and means for transmitting an alternating magnetic induction field spaced behind the temperature sensor in the retorting path, the transmitting means including means for modulating the transmitted field responsive to the temperature sensor;

intercepting the modulated magnetic induction field outside the retort to determine the temperature as the retorting path progresses toward the transmitting means.

2. The method of claim 1, in which the retorting path progresses downwardly through the retort, the implanting step comprising implanting the transmitting means in the retort with the temperature sensor extending upwardly therefrom.

3. The method of claim 1, in which the frequency of the magnetic induction field is less than 40 khz.

4. The method of claim 1, in which the implanting step comprises drilling a bore hole into the retort from a point of access with ground level, lowering the transmitter into the bore hole, and packing sand around the transmitter to reduce shock.

5. The method of claim 1, additionally comprising the step of fragmenting the retort.

6. The method of claim 1, additionally comprising the step of fragmenting the retort after implanting the transmitting means therein.

7. A self-contained data transmitting system adapted for implantation in an in situ oil shale retort, the system comprising:

a transmitter package;

a wand extending from the package;

a temperature sensor mounted on the end of the wand;

a transmitter disposed in the package, the transmitter including means responsive to the temperature sensor for generating data pulses having constant duration and a temperature representative frequency and modulating means for turning a carrier on while a data pulse is present and for turning the carrier off while no data pulse is present; and a transmitting antenna disposed in the package including an inductive winding having an electrical length significantly smaller than the wavelength of the modulated carrier, the antenna being connected to the modulating means to transmit the modulated carrier.

8. The system of claim 7, in which the transmitting antenna includes a capacitor connected to the winding to tune the antenna to the frequency of the carrier.

9. The system of claim 7, in which the frequency of the carrier is less than 40 khz.

10. The system of claim 7, in which the frequency of the carrier is less than 10 khz.

11. The system of claim 7, additionally comprising a main housing in which the modulating means and the transmitting antenna are located and a probe extending from the main housing, the temperature sensor being located in the end of the probe.

12. The system of claim 7, additionally comprising battery means disposed in the package to energize the transmitter.

13. The system of claim 12, in which the package and the transmitting antenna are cylindrical and coaxially arranged and the battery means comprises a plurality of batteries annularly arranged around the package.

14. The system of claim 13, additionally comprising a plurality of annular circuit boards disposed in the package in axial alignment with the antenna, the transmitter components being mounted on the circuit boards.

15. A transmitter for use in determining the temperature at a remote point in a fragmented in situ oil shale retort comprising:

a housing configured for insertion into an oil shale deposit, said housing being further configured for protecting components disposed therein from shocks due to fragmentation of the oil shale deposit surrounding the housing after insertion of the housing into said oil shale deposit;

temperature sensing means disposed exterior of said housing for sensing the temperature in said oil shale deposit proximate the housing and for generating an electrical signal corresponding thereto;

means disposed within said housing for generating a carrier wave of a preselected wavelength;

means disposed within said housing for modulating said carrier wave with the electrical corresponding to the sensed temperature, to produce carrier wave pulses of equal duration having a frequency representative of the sensed temperature; and antenna means disposed within said housing for generating a magnetic induction field corresponding to the modulated carrier wave, said antenna means includes a winding having an electrical length significantly smaller than the wavelength of the modulated carrier wave.

* * * * *